(12) United States Patent
Wijnands et al.

(10) Patent No.: US 7,742,475 B2
(45) Date of Patent: Jun. 22, 2010

(54) TECHNIQUES FOR DISTRIBUTING REPLICATION POINTS FOR TRAFFIC USING POINT-TO-POINT LINKS

(75) Inventors: Ijsbrand Wijnands, Leuven (NL); Arjen Boers, Sitges (NL)

(73) Assignee: Cisco Technology, Inc., San Jose, CA (US)

( * ) Notice: Subject to any disclaimer, the term of this patent is extended or adjusted under 35 U.S.C. 154(b) by 611 days.

(21) Appl. No.: 11/417,829

(22) Filed: May 3, 2006

(65) Prior Publication Data
US 2007/0258454 A1 Nov. 8, 2007

(51) Int. Cl.
H04L 12/28 (2006.01)
H04L 12/56 (2006.01)
H04H 20/71 (2008.01)
H04J 3/26 (2006.01)

(52) U.S. Cl. .................. 370/390; 370/312; 370/432
(58) Field of Classification Search .................. 370/390, 370/401, 351, 312, 432; 455/503
See application file for complete search history.

(56) References Cited

U.S. PATENT DOCUMENTS

| | | | | |
|---|---|---|---|---|
| 5,361,256 A | * | 11/1994 | Doeringer et al. | 370/390 |
| 5,831,975 A | * | 11/1998 | Chen et al. | 370/256 |
| 6,490,586 B1 | * | 12/2002 | Goft et al. | 707/10 |
| 6,707,796 B1 | * | 3/2004 | Li | 370/254 |
| 6,732,189 B1 | * | 5/2004 | Novaes | 709/249 |
| 7,180,864 B2 | * | 2/2007 | Basu et al. | 370/238 |
| 7,203,768 B2 | * | 4/2007 | Olsen | 709/249 |
| 7,263,099 B1 | * | 8/2007 | Woo et al. | 370/390 |
| 2002/0085506 A1 | * | 7/2002 | Hundscheidt et al. | 370/254 |
| 2004/0233907 A1 | * | 11/2004 | Hundscheidt et al. | 370/390 |
| 2005/0076099 A1 | * | 4/2005 | Wang et al. | 709/219 |
| 2006/0182049 A1 | * | 8/2006 | Rokui | 370/312 |

OTHER PUBLICATIONS

Rosen, Eric C., et al. "Multicast in MPLS/BGP IP VPNs" Network Working Group, Internet Draft https://www.ietf.org/internet-drafts/draft-ietf-l3vpn-2547bis-mcast-01.txt; 56 pages, Dec. 2005.
End System Multicast, 5 pages, http://esm.cs.cmu.edu/technology/.

* cited by examiner

*Primary Examiner*—Ayaz R Sheikh
*Assistant Examiner*—Hoang-Chuong Q Vu
(74) *Attorney, Agent, or Firm*—Trellis IP Law Group, PC

(57) ABSTRACT

Techniques for dynamically distribute replication points based on routing metrics are provided. A receiver list may be split based on the routing metrics. For example, the receiver list may be split based on unicast reachability over an interface. If portions of egress routers are reachable over different interfaces, the portions are included together in a sublist. Thus, the list is split into sublists based on the reachability. Point-to-point links are then set up between a head end router and an egress router in each sublist. The sublist is then sent to each egress router, which can perform the process above in setting up a point-to-point link to another egress router in each sublist.

24 Claims, 4 Drawing Sheets

TECHNIQUES FOR DISTRIBUTING REPLICATION POINTS FOR TRAFFIC USING POINT-TO-POINT LINKS

BACKGROUND OF THE INVENTION

Embodiments of the present invention generally relate to networking and more specifically to techniques for dynamically selecting replication points for replicating traffic.

Multiple receivers may desire traffic from a source. Egress routers for each receiver may then request traffic from the source. The traffic from the source may be multicasted from a head-end router to each egress routers. Each egress router then sends the information to a receiver. The head-end router replicates the traffic for all interested egress routers using point-to-point links.

The head-end router thus does all the replication of the traffic. This includes many disadvantages. For example, there is a large load on the head-end router because it has to replicate all the traffic for all requesting egress routers. Also, since all replicated traffic is sent from the head end router, the load on the link into the core of the network for the head-end router is also increased.

SUMMARY

Techniques for dynamically distribute replication points based on routing metrics are provided. A receiver list may be split based on the routing metrics. For example, the receiver list may be split based on unicast reachability over an interface. If portions of egress routers are reachable over different interfaces, the portions are included together in a sublist. Thus, the list is split into sublists based on the reachability. Point-to-point links are then set up between a head end router and an egress router in each sublist. The sublist is then sent to each egress router, which can perform the process above in setting up a point-to-point link to another egress router in each sublist.

DETAILED DESCRIPTION OF EMBODIMENTS OF THE INVENTION

Figure 1:
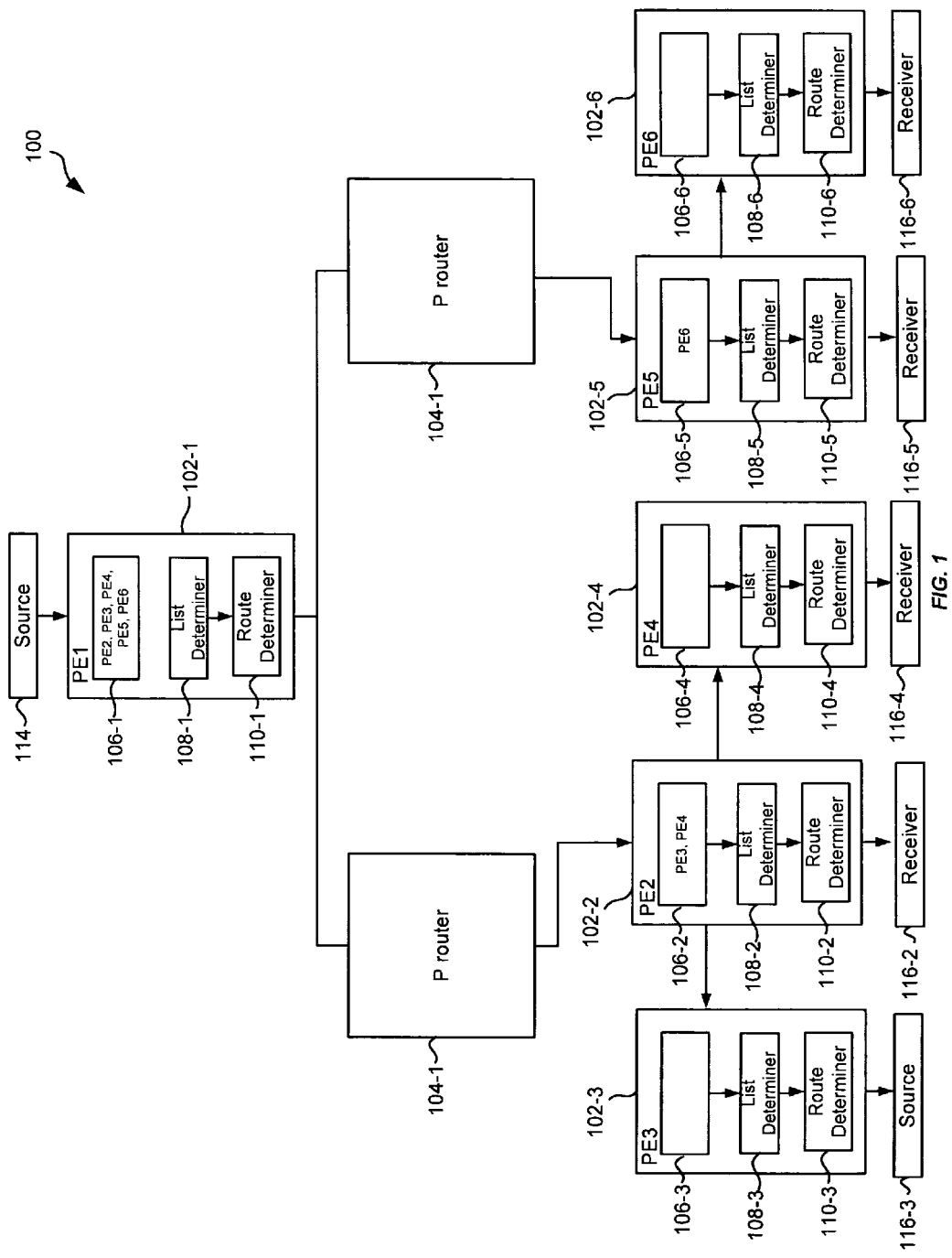
FIG. 1 depicts a system for replicating traffic according to one embodiment of the present invention.

FIG. 1 depicts a system 100 for replicating traffic according to one embodiment of the present invention. As shown, a network configured to route traffic from a source 114 to receivers 116 is provided. A network includes a head-end router 102-1, and egress routers 102-2, 102-3, 102-4, 102-5, and 102-6. P routers 104 (i.e., core routers) are also provided. Although this network configuration is shown, it will be understood that other network configurations will be appreciated and will be described below in more detailed detail.

Routers 102 are routers at the edge of a network. For example, they may be provider edge (PE) routers. Head end router 102-1 is configured to receive traffic from source 114. Egress routers 102-2-102-6 are configured to receive traffic and send it to receivers 116. P routers 104 are routers in the core of the network. Although routers are described, it will be understood that other network devices may be appreciated.

Receivers 116 are any devices behind egress routers 102. Receivers 116 may be interested in receiving traffic from source 114. Source 114 may be any source providing traffic. In one embodiment, source 114 is a multicast source.

When receiver 116 wants to receive traffic from source 114, egress router 102 sends a request to head-end router 102-1 for the traffic. For example, a protocol independent multicast (PIM) join request may be sent. This requests multicast traffic for receiver 116. The request is sent through the core (through p routers 104) and is received at head-end router 102-1. In one embodiment, receivers 116-2-receivers 116-6 are all interested in receiving traffic from source 114. Thus, egress routers 102-2-102-6 send requests to head-end router 102-1.

A receiver list 106-1 is generated that includes the list of egress routers 102 that are interested in traffic from source 114. As shown, receiver list 106-1 includes identifiers (PE2, PE3, PE4, PE5, and PE6) for egress routers 102-2-102-6.

Embodiments of the present invention are configured to dynamically distribute replication points based on routing metrics. Receiver list 106 may be split based on the routing metrics. For example, receiver list 106-1 may be split based on unicast reachability over an interface. If portions of egress routers 102 are reachable over different interfaces, the portions are included together in a sublist. Thus, the list is split into sublists based on the reachability. It will be understood that if all egress routers 102 are reachable over a single interface, receiver list 106 may not be split. This will be described in more detail below.

Egress routers 102 are then chosen in each sublist. Each router 102 is chosen using routing metrics. A point-to-point link is set up to the chosen egress router 102 in each sublist. The remaining routers in each sublist are sent to each chosen egress router 102, wherein each chosen egress router 102 now becomes a replication point.

Egress routers 102 then perform the same process as head end router 102 performed. For example, each egress router 102 determines if the sublist should be split based on routing metrics. It then selects another egress router 102 to set up a point-to-point link. This process continues as point-to-point links are set up for all routers 102 in receiver list 106.

The above process will now be described in more detail. As shown, a list determiner 108-1 accesses receiver list 106-1. List determiner 108-1 determines if receiver list 106 should be split based on routing metrics. The routing metrics may include any metrics used for routing traffic in which router 102 has access, such as interior gateway protocol (IGP) metrics. For example, the metrics may include a bandwidth of a link, a closest router in distance, or any other metrics.

In one example, the routing metrics may be unicast reachability over different interfaces. Different sets of egress routers 102 may be reachable over different physical interfaces. As shown, egress routers 102-2-102-4 may be reached through P router 104-1 and egress routers 102-5 and 102-6 may be reached through P router 104-2. In this case, receiver list 106 may be split into two different sublists. The first sublist includes egress routers 102-2-102-4 and the second sublist includes egress routers 102-5 and 102-6.

A route determiner 110-1 is configured to determine an egress router 102 in each sublist in which to set up a point-to-point link. The point-to-point link may be a point-to-point label switched path (LSP). This link may not be signaled hop by hop (i.e., from head end router 102-1 to P router 104-1 to egress router 102-2) but directed between head end router 102-1 and egress router 102-2.

Routing metrics are used to determine which egress router 102 to set up a point-to-point link first. In one example, the closest egress router 102 found in each sublist may be determined. If multiple egress routers 102 have equal metrics, a policy may be used to decide which one to choose. For example, the policy may be to select egress router 102 that has the lowest numerical IP address.

In one embodiment, egress router 102-2 is selected in the first sublist and egress router 102-5 is selected in the second sublist. Router determiner 110-1 then sets up point-to-point links with egress router 102-2 and egress router 102-4.

For example, a first point-to-point link is set up between head-end router 102-1 and egress router 102-2 and a second point-to-point link is set up between head-end router 102-1 and egress router 102-5. A list of remaining egress routers 102 for each sublist is then sent. For example, a sublist 106-2 with egress routers 102-3 and 102-4 (PE3 and PE4) on it is sent to egress router 102-2. Also, a sublist 106-5 is sent to egress router 102-5 and includes egress router 102-6 (PE6) in it. In one embodiment, downstream PIM joins are sent to egress routers 102-2 and 102-5 with the remaining egress routers 102 in each sublist.

Egress router 102-2 can then set up a point-to-point link to an egress router 102 in receiver sublist 106-2. The same algorithm as described above with respect to head end router 102-1 may be used. For example, if multiple egress routers 102 are found in sublist 106-2, list determiner 108-2 determines if sublist 106-2 needs to be split again based on the routing metrics.

In this example, egress router 102-3 and egress router 102-4 are found in sublist 106-2. List determiner 108-2 is configured to determine that egress routers 102-3 and 102-4 are reachable over different interfaces. Thus, egress router 102-2 splits sublist 106-2. In this case, there are no other egress routers 102 on sublist 106-2 after it is split. However, if there were other egress routers 102 reachable over the interfaces, they would be sent in another sublist.

Router determiner 110-2 sets up a point-to-point link between egress router 102-2 and egress router 102-3 and between egress router 102-2 and egress router 102-4. Egress router 102-2 may send a signal indicating that no more egress routers 102 are found on sublist 106-2, or it sends an empty list to 102-3 and 102-4. Thus, egress routers 102-3 and 102-4 do not set up another point-to-point link.

Also, egress router 102-5 receives sublist 106-5. A list determiner 108-5 examines it and determines if it should be split based on the routing metrics. In this case, egress router 102-6 is included in sublist 106-3 and sublist 106-3 does not need to be split. Router determiner 110-5 then sets up a point-to-point link between egress router 102-4 and egress router 102-5. There are no more egress routers 102 on sublist 106-3; route determiner 110-5 sends a signal to egress router 102-6 that no more receivers are on sublist 106-3. Egress router 102-6 receives the signal or it receives an empty list and thus does not set up a point-to-point link to any other egress routers 102.

Accordingly, point-to-point links are set up between egress routers 102 that have subscribed to receive the multicast traffic. Downstream egress routers 102 are dynamically chosen as replication points using routing metrics. Thus, replication is distributed. This alleviates load on head end router 102-1.

The replication points can be dynamically chosen because egress routers 102 have access to routing metrics. These metrics may be used to determine which egress routers 102 can be reached through which interfaces. Also, downstream egress routers 102 that make good candidates for replication points can also be chosen using the routing metrics. Hosts, on the other hand, do not have access to routing metrics and thus cannot dynamically determine replication points.

The point-to-point links set up a virtual link. The traffic from source 114 may flow from head end router 102-1 to egress routers 102-2 and 102-5. Head end router 102-1 thus replicates traffic twice, instead of replicating traffic for all five egress routers 102-2-102-6. Egress routers 102-2 and 102-5 receive the traffic and are also replication points.

Egress router 102-2 then sends the traffic to egress routers 102-3 and 102-4 separately. Also, egress router 102-5 sends the traffic to router 106-6. Thus, the replication of traffic is offloaded using embodiments of the present invention.

Head end router 102 maintains the full list 106 of egress routers 102 that subscribed to receive the traffic. List 106 may change as egress routers may drop out of list 106 (i.e., they no longer wish to receive the traffic) or egress routers may join list 106. In these cases, head end router 102 may have to do new signaling. Head end router 102-1 re-organizes the lists and signals it to egress routers, which can modify point-to-point links. For example, egress router 102-4 may signal to head-end router 102-1 that it is no longer interested in the traffic. Head end router 102-1 creates a new receiver list and signals this receiver list to egress router 102-2. As this receiver list no longer contains egress router 102-4, router 102-2 tears down the point-to-point link to egress router 102-4 and only maintains the point-to-point link to egress router 102-3. Head end router 102-1 may maintain how list 106 was split and signal the appropriate egress routers 102-2-102-6 that are affected by the change in list 106. For example, as the list is split, head end router 102-1 can determine which egress routers to send the modifications to based on how the list was split.

Figure 2:
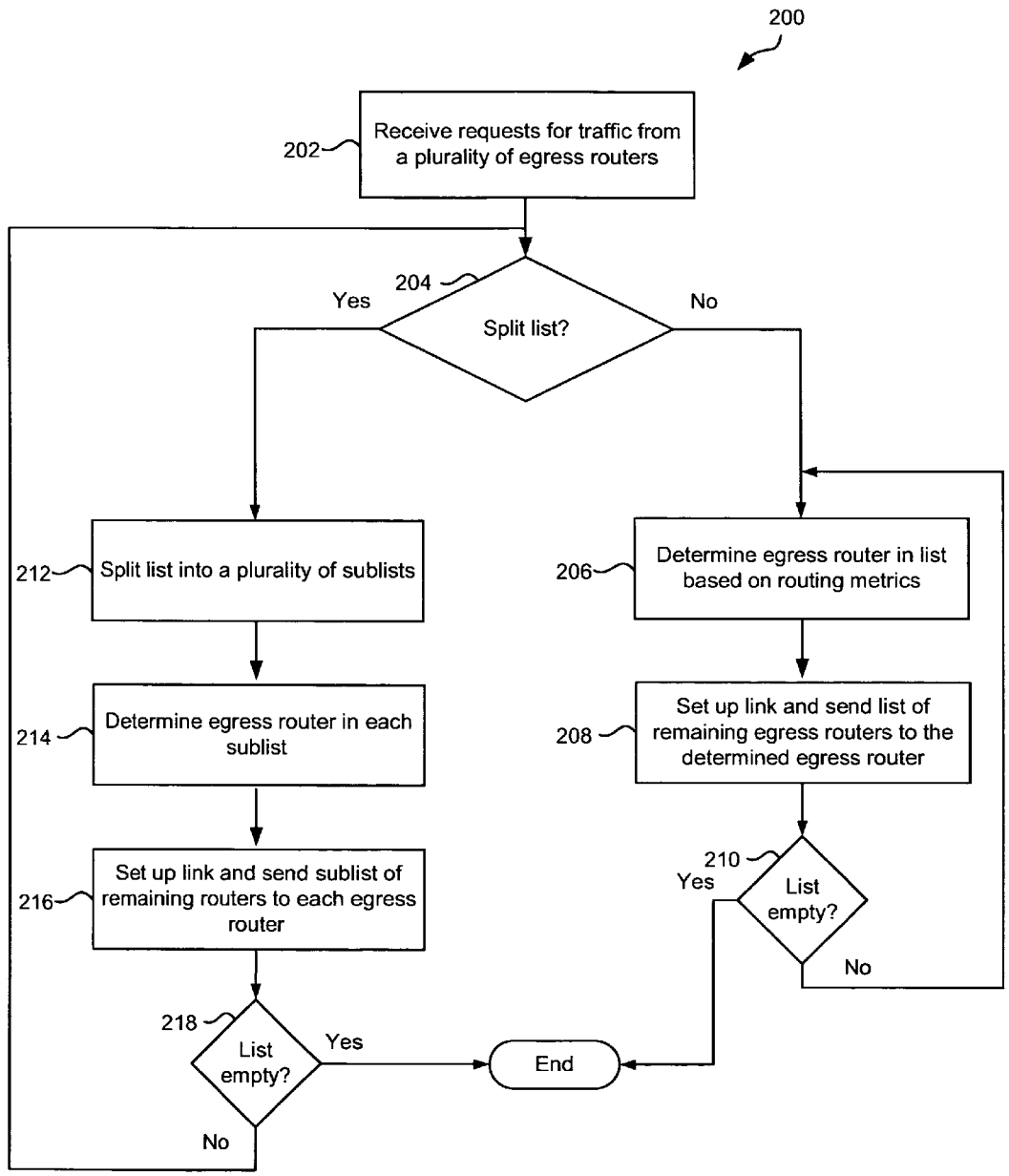
FIG. 2 depicts a simplified flow chart of a method for routing traffic according to one embodiment of the present invention.

FIG. 2 depicts a simplified flow chart 200 of a method for routing traffic according to one embodiment of the present invention.

Step 202 receives requests for traffic from a plurality of egress routers 102. The requests may be for receivers 116 connected to egress routers 102.

Step 204 determines if a list of egress routers 102 needs to be split based on routing metrics. The list may be split based on unicast reachability through physical interfaces.

If the list does not need to be split, step 206 determines an egress router 102 in list 106 based on routing metrics. In this case, all routers on receiver list 106 can be reached through the same interface. Step 208 then sets up a point-to-point link to the determined egress router 102 and sends a list of the remaining routers to a second egress router 102.

Step 210 determines if any routers are left on the list. If not, then the process ends. If there are, the process then reiterates to step 206 where the process as described above then proceeds with each receiving egress router 102 determining another router 102 in which to set up a point-to-point link.

Referring back to step 204, if a list does need to be split, step 212 splits list 106 into a plurality of sublists.

Step 216 determines an egress router 102 in each of the sublists to set up a point-to-point link to. This is determined based on routing metrics.

Step 218 then sets up a point-to-point link to each determined egress router 102 and sends a sublist of the remaining routers to each receiving egress router 102. Step 220 determines if any routers are left on the list for each sublist. If not, then the process ends. If there are, the process then reiterates to step 206 where the process as described above proceeds.

Eventually, the process dynamically selects replication points and eventually set up point-to-point links for all egress routers 102 in receiver list 106.

Figure 3:
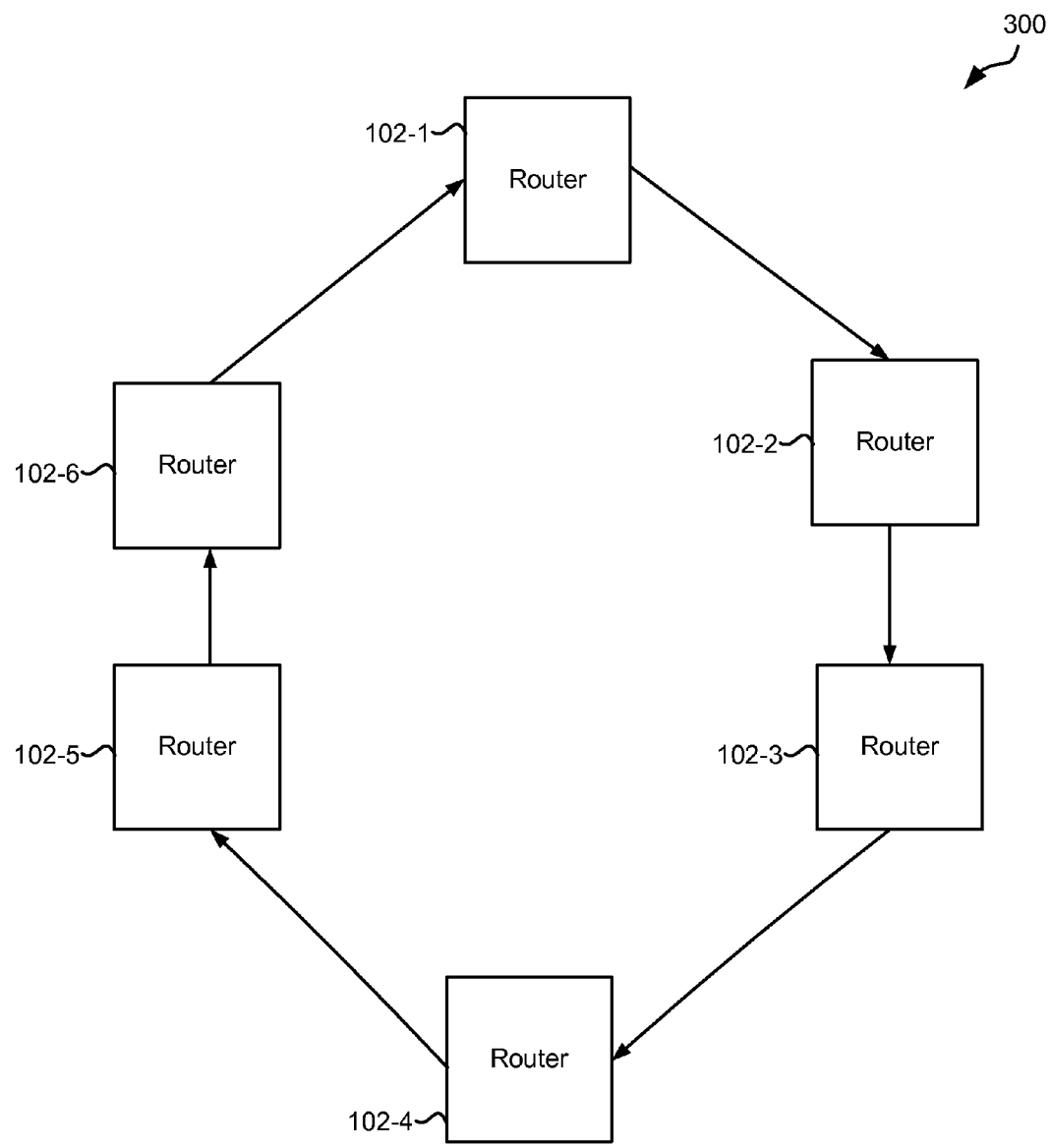
FIG. 3 shows a different network configuration of a network according to one embodiment of the present invention.

FIG. 3 shows a different network configuration 300 of a network according to one embodiment of the present invention. As shown, routers 102-1-102-6 are connected by physical links in a ring topology. Thus, if traffic needs to be sent from router 102-1 to router 102-4, it can either be sent through router 102-2 and 102-3 or through router 102-6 and router 102-5.

In a conventional ring topology, router 102-1 would replicate the traffic for each router 102-2-102-6. Thus, the traffic is replicated five times over point-to-point links. Each link between routers 102 consumes N−1 times the traffic. For example, five times the traffic will be sent from router 102-1 to router 102-2. Router 102-2 will then send four times the traffic to router 102-3 (i.e., the traffic for 102-3, 102-4, 102-5, and 102-6). Router 102-3 will then send three times the traffic (i.e., the traffic for 102-4, 102-5, and 102-6) to router 102-4, and so on. This process continues as traffic is sent to each router 102 in the ring topology.

Using embodiments of the present invention, a receiver list 106 may include routers 102-2-102-6. Router 102-1 determines if receiver list 106 needs to be split. In this case, routers 102-2-102-6 are reachable over the same interface and thus list 106 is not split.

Router 102-1 then determines a router in list 106 to set up a point-to-point link to based on routing metrics. For example, router 102-1 may determine that router 102-2 is the closest router. Router 102-1 then sets up a point-to-point link to router 102-2. It will also send a first sublist that includes routers 102-3-102-6.

Router 102-2 is now a new replication point. Router 102-2 determines if the first sublist should be split. In this case, it should not and router 102-2 determines a router in the first sublist in which to set up a point-to-point link. Router 102-2 then determines that it should set up a point-to-point link to router 102-3 based on routing information. Also, a second sublist is sent to router 102-2 that includes routers 102-4-102-6.

The above process continues as point-to-point links are set up between routers 102-3 and 102-4, routers 102-4 and 102-5, and routers 102-5 and 102-6. Each point-to-point link will only carry the traffic once and head-end router 102-1 only has to replicate the traffic once. This may be more efficient than replicating the traffic N times in addition to having a link consume N−1 traffic. Rather, each link carries traffic for one router 102. Further, the traffic may flow counterclockwise or clockwise based on policy.

Figure 4:
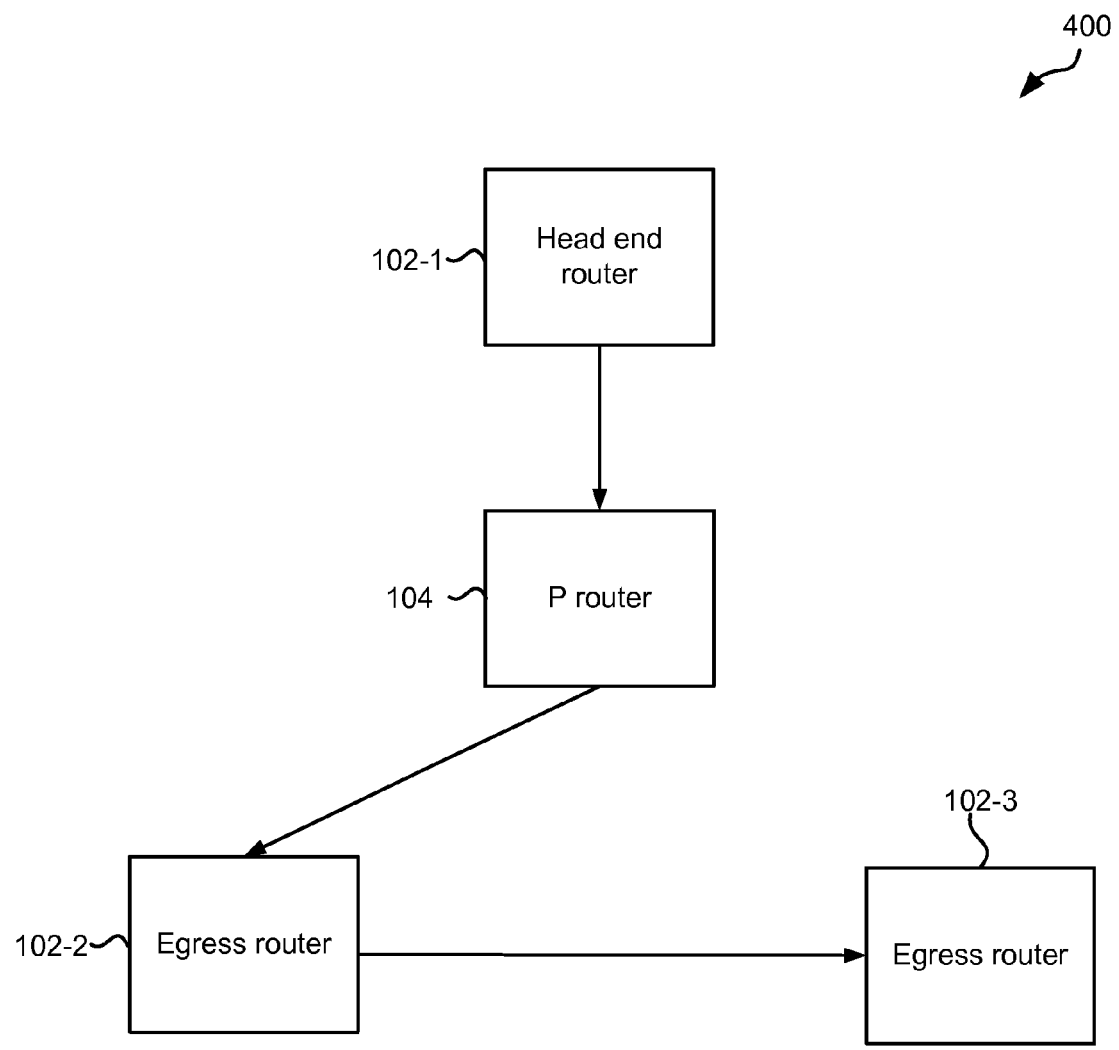
FIG. 4 depicts another network configuration of a network according to one embodiment of the present invention.

FIG. 4 depicts another network configuration 400 of a network according to one embodiment of the present invention. As shown, a head end router 102-1 receives traffic from source 114. Egress routers 102-2, 102-3, and 102-4 have receivers 116 that that are interested in traffic from source 114. A P router 104 is also provided.

Head end router 102-1 compiles a receiver list that includes egress routers 102-2-102-3. As can be seen, egress routers 102-2-102-3 are reachable over the same interface. Conventionally, head end router 102-1 would have set up separate point-to-point links to egress router 102-2 and egress router 102-3. Head end router 102-1 would then have to replicate traffic for both egress routers 102-2-102-3. This consumes additional resources and CPU cycles on head end router 102-1. Further, additional bandwidth is consumed on the link to P router 104 into the core of the network.

Using embodiments of the present invention, head end router 102-1 sets up one point-to-point link to one egress router 102 based on routing metrics. For example, the closest egress router 102 is selected.

Head end router 102-1 may set up a point-to-point link to egress router 102-2. The rest of receiver list is signaled to egress router 102-2. Egress router 102-2 is then configured to set up a point-to-point link to a router based on routing metrics. In this case, egress router 102-2 determines that a point-to-point link should be set up to egress router 102-3. In this case, there are no routers left on the list. Thus, egress router 102-3 does not need to set up another point-to-point link.

Head end router 102-1 and egress router 102-2 each perform one replication. The replication is distributed instead of having one router perform the replication. This alleviates load on head end router 102-1 and also load on the link into the core.

The signaling is done toward the head end router closest to source 114. The reverse path forwarding (RPF) interface on which traffic is accepted may be different from this. For example, in FIG. 1, egress router 102-2 and 102-3 may signal head end router 102-1 that they are interested in receiving the traffic. The signaling may go from egress router 102-2 via a link to head end router 102-1 and from egress router 102-3 via a link to head end router 102-1. However, when the point-to-point links are set up, the links may not direct links from egress router 102-2 to head end router 102-1 and from egress router 102-3 to head end router 102-1. Rather, a point to point link may be set up from head end router 102-1 to egress router 102-2 and then a point to point link is set up between egress router 102-2 to egress router 102-3.

Embodiments of the present invention allow deployments where not all routers in the network are capable of doing multicast replication. If not all routers in the network are capable of doing multicast replication, the only way that multicast traffic could reach a set of egress routers is if the head-end router does the replication. Embodiments of the present invention allow multicast to be performed in this deployment without having the head end router do all the replication.

Although the invention has been described with respect to specific embodiments thereof, these embodiments are merely illustrative, and not restrictive of the invention. For example, embodiments of the present invention may be used for IP based networks. The replication is done at the application level. The point-to-point paths may also use generic routing encapsulation (GRE) to set up point-to-point paths. This encapsulation may be used instead of MPLS encapsulation. The techniques of splitting receiver list 106, sending it downstream, and choosing a router 102 based on routing metrics may still be used.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer-readable medium can be, by way of example only but not by limitation, a semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the sane embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method for distributing replication points in a network for distributing traffic from a source, the method comprising:
   determining, at a first network routing device, if a first list of a plurality of network routing devices should be split into a plurality of sublists of sets of network routing devices based on a unicast reachability analysis by determining portions of the first list that are reachable through one or more interfaces of the first network routing device to the network routing devices in the first list, wherein splitting the first list is for distributing replication points for replicating the traffic from the source and the first list is split based on unicast reachability of network routing devices in each set, wherein network routing devices are configured to route the traffic;

if the first list should be split into the sublists, wherein each sublist includes a portion of the first list that is reachable over one of the interfaces, performing the steps of:

selecting a recipient network routing device in each of the plurality of sets of network routing devices based on routing metrics of a point-to-point link from the first network routing device to each of the recipient network routing devices; and setting up a first point-to-point link from the first network routing device to each of the selected recipient network routing devices, wherein each selected recipient network routing device receives one of the sublists of any remaining network routing devices in a corresponding set of network routing devices, and is configured to split the received sublist, if any remaining network routing devices are on the received sublist, to set up a second point-to-point link to a remaining network routing device in the received sublist, wherein the first network routing device is configured as a replication point to replicate traffic received from the source to each of the selected recipient network routing devices.

2. The method of claim 1, further comprising sending the traffic via the set up first point-to-point link to each of the recipient network routing devices.

3. The method of claim 1, wherein whenever a split of the first list, sublist or subsequent sublists occurs, a network routing device performing the split becomes a replication point.

4. A method for distributing replication points in a network for distributing traffic from a source, the method comprising:

determining a first list of a plurality of network routing devices that requested the traffic from the source based on a unicast reachability analysis through one or more interfaces of a first network routing device to network routing devices in the first list;

selecting a second network routing device in the plurality of network routing devices based on routing metrics of a point-to-point link from the first network routing device to the second network routing device, wherein selection of the second network routing device is for distributing replication points for replicating the traffic from the source, wherein network routing devices are configured to route the traffic;

determining a second list of at least a portion of the plurality of network routing devices by splitting the first list such that the second list is a sublist of the first list, wherein the routing metrics are used to determine reachability of the at least the portion of the plurality of network routing devices through recipient network routing devices;

setting up a first point-to-point link from the first network routing device acting as a replication point to the second network routing device; and sending the second list to the second network routing device, wherein the second network routing device is configured to set up a second point-to-point link to a third network routing device in the second list of at least the portion of the plurality of network routing devices.

5. The method of claim 4, further comprising:

determining a third list of at least a second portion of the plurality of network routing devices, wherein the third list is split from the second list;

setting up a third point-to-point link from the third network routing device to a fourth network routing device; and sending the third list to the fourth network routing device.

6. The method of claim 4, wherein the routing metrics comprise interior gateway protocol (IGP) metrics.

7. The method of claim 4, wherein the routing metrics comprise a closest network routing device metric, wherein the second network routing device is a closest network routing device in the plurality of network routing devices to the first network routing device.

8. The method of claim 4, wherein if routing metrics for the second network routing device and third network routing device in the plurality of routing network routing devices are equal, the method further comprising:

selecting from either the second network routing device or the third network routing device based on the policy.

9. The method of claim 4, wherein the routing metrics for all of the plurality of network routing devices in the first list are analyzed in selecting the second network routing device.

10. The method of claim 4, wherein point-to-point links are set up for all of the plurality of network routing devices in the first list based on routing metrics.

11. The method of claim 4, further comprising sending the traffic from the first network routing device to the second network routing device through the first point-to-point link, wherein the second network routing device sends the traffic to the third network routing device through the second point-to-point link.

12. The method of claim 4, wherein whenever a split of the first list, second list or subsequent lists occurs, a network routing device performing the split becomes a replication point.

13. A first network routing device configured to distribute replication points in a network for distributing traffic from a source, wherein the first network routing device comprises:

one or more computer processors; and a memory containing instructions that, when executed by the one or more computer processors, cause the one or more computer processors to perform a set of steps comprising:

determining, at the first network routing device, if a first list of a plurality of network routing devices should be split into a plurality of sublists of sets of network routing devices based on a unicast reachability analysis by determining portions of the first list that are reachable through one or more interfaces of the first network routing device to the network routing devices in the first list, wherein splitting the first list is for distributing replication points for replicating the traffic from the source and the first list is split based on unicast reachability of network routing devices in each set, wherein network routing devices are configured to route the traffic;

if the first list should be split into the sublists, wherein each sublist includes a portion of the first list that is reachable over one of the interfaces, performing the steps of:

selecting a recipient network routing device in each of the plurality of sets of network routing devices based on routing metrics of a point-to-point link from the first network routing device to each of the recipient network routing devices; and setting up a first point-to-point link from the first network routing device to each of the selected recipient network routing devices, wherein each selected recipient network routing device receives one of the sublists of any remaining network routing devices in a corresponding set of network routing devices, and is configured to split the received sublist, if any remaining network routing devices are on the received sublist, to set up a second point-to-point link to a remaining network routing device in the received sublist, wherein the first network routing device is configured as a replication point to replicate traffic received from the source to each of the selected recipient network routing devices.

14. The network routing device of claim 13, wherein the instructions cause the one or more processors to perform further steps comprising sending the traffic via the set up point-to-point links to each of the recipient network routing devices.

15. A first network routing device configured to distribute replication points in a network for distributing traffic from a source, wherein the first network routing device comprises:
one or more computer processors; and
a memory containing instructions that, when executed by the one or more computer processors, cause the one or more computer processors to perform a set of steps comprising:
determining a first list of a plurality of network routing devices that requested the traffic from the source based on a unicast reachability analysis through one or more interfaces of the first network routing device to network routing devices in the first list;
selecting a second network routing device in the plurality of network routing devices based on routing metrics of a point-to-point link from the first network routing device to the second network routing device, wherein selection of the second network routing device is for distributing replication points for replicating the traffic from the source, wherein network routing devices are configured to route the traffic;
determining a second list of at least a portion of the plurality of network routing devices by splitting the first list such that the second list is a sublist of the first list, wherein the routing metrics are used to determine reachability of the at least the portion of the plurality of network routing devices through recipient network routing devices;
setting up a first point-to-point link from the first network routing device acting as a replication point to the second network routing device; and
sending the second list to the second network routing device, wherein the second network routing device is configured to set up a second point-to-point link to a third network routing device in the second list of at least the portion of the plurality of network routing devices.

16. The first network routing device of claim 15, further comprising:
determining a third list of at least a second portion of the plurality of network routing devices, wherein the third list is split from the second list;
setting up a third point-to-point link to a fourth routing device; and
sending the third list to the fourth network routing device.

17. The first network routing device of claim 15, wherein the routing metrics comprise interior gateway protocol (IGP) metrics.

18. The first network routing device of claim 15, wherein the routing metrics comprise a closest network routing device metric, wherein the second network routing device is a closest network routing device in the plurality of network routing devices to the first network routing device.

19. The first network routing device of claim 15, wherein if routing metrics for the second network routing device and another network routing device in the plurality of network routing devices are equal, the set of steps further comprising:
selecting from either the second network routing device or the another network routing device based on the policy.

20. The first network routing device of claim 15, wherein the step of selecting the second network routing device comprises analyzing the routing metrics for all of the plurality of network routing devices in the first list.

21. The first network routing device of claim 15, wherein point-to-point links are set up for all of the plurality of network routing devices in the first list based on routing metrics.

22. The first network routing device of claim 15, wherein the instructions cause the one or more computer processors to perform further steps comprising sending the traffic from the first network routing device to the second network routing device through the first point-to-point link, wherein the second network routing device sends the traffic to the third network routing device through the second point-to-point link.

23. A first network routing device configured to distribute replication points in a network for distributing traffic from a source, the device comprising:
means for determining, at the first network routing device, if a first list of a plurality of network routing devices should be split into a plurality of sublists of sets of network routing devices based on a unicast reachability analysis by determining portions of the first list that are reachable through one or more interfaces of the first network routing device to the network routing devices in the first list, wherein splitting the first list is for distributing replication points for replicating the traffic from the source and the first list is split based on unicast reachability of network routing devices in each set, wherein network routing devices are configured to route the traffic;
means for selecting a recipient network routing device in each of the plurality of sets of network routing devices based on routing metrics of a point-to-point link from the first network routing device to each of the recipient network routing devices if the first list should be split; and
means for setting up a first point-to-point link from the first network routing device to each of the selected recipient network routing devices if the first list should be split, wherein each selected recipient network routing device receives one of the sublists of any remaining network routing devices in a corresponding set of network routing devices and is configured to split the received sublist, if any remaining network routing devices are on the received sublist, to set up a second point-to-point link to a remaining network routing device in the received sublist,
wherein the first network routing device is configured as a replication point to replicate traffic received from the source to each of the selected recipient network routing devices.

24. A first network routing device configured to distribute replication points in a network for distributing traffic from a source, the device comprising:
means for determining a first list of a plurality of network routing devices that requested the traffic from the source based on a unicast reachability analysis through one or more interfaces of the first network routing device to network routing devices in the first list;
means for selecting a second network routing device in the plurality of network routing devices based on routing metrics of a point-to-point link from the first network routing device to the second network routing device, wherein selection of the second network routing device is for distributing replication points for replicating the traffic from the source, wherein network routing devices are configured to route the traffic;

means for determining a second list of at least a portion of the plurality of network routing devices by splitting the first list such that the second list is a sublist of the first list, wherein the routing metrics are used to determine reachability of the at least the portion of the plurality of network routing devices through recipient network routing devices;

means for setting up a first point-to-point link from the first network routing device acting as a replication point to the second network routing device; and means for sending the second list to the second network routing device, wherein the second network routing device is configured to set up a second point-to-point link to a third network routing device in the second list of at least the portion of the plurality of network routing devices.

* * * * *